United States Patent
Horihata et al.

(10) Patent No.: US 12,415,917 B2
(45) Date of Patent: Sep. 16, 2025

(54) FIBER FOR ARTIFICIAL HAIR AND HAIR ACCESSORY PRODUCT

(71) Applicant: DENKA COMPANY LIMITED, Tokyo (JP)

(72) Inventors: Atsushi Horihata, Kamakura (JP); Masamichi Kanaoka, Kamakura (JP); Masashi Kume, Tokyo (JP); Atsushi Takei, Kamakura (JP)

(73) Assignee: DENKA COMPANY LIMITED, Tokyo (JP)

( * ) Notice: Subject to any disclaimer, the term of this patent is extended or adjusted under 35 U.S.C. 154(b) by 953 days.

(21) Appl. No.: 16/957,466

(22) PCT Filed: Mar. 18, 2019

(86) PCT No.: PCT/JP2019/011240
§ 371 (c)(1),
(2) Date: Jun. 24, 2020

(87) PCT Pub. No.: WO2019/181868
PCT Pub. Date: Sep. 26, 2019

(65) Prior Publication Data
US 2021/0246294 A1   Aug. 12, 2021

(30) Foreign Application Priority Data

Mar. 20, 2018  (JP) ................. 2018-052130

(51) Int. Cl.
| *C08L 27/06* | (2006.01) |
| *C08L 25/12* | (2006.01) |
| *D01F 6/48* | (2006.01) |
| *D01F 6/54* | (2006.01) |
| *D01F 6/56* | (2006.01) |
| *A41G 3/00* | (2006.01) |

(52) U.S. Cl.
CPC .............. *C08L 27/06* (2013.01); *C08L 25/12* (2013.01); *D01F 6/48* (2013.01); *D01F 6/54* (2013.01); *D01F 6/56* (2013.01); *A41G 3/0083* (2013.01); *D10B 2503/08* (2013.01)

(58) Field of Classification Search
CPC . C08L 27/06; C08L 25/12; D01F 6/48; D01F 6/54; D01F 6/56; A41G 3/0083; A41G 3/00; D10B 2503/08
USPC ........................................................ 428/364
See application file for complete search history.

(56) References Cited

FOREIGN PATENT DOCUMENTS

| JP | H08-296115 A | 11/1996 | |
| JP | 2001-131824 A | 5/2001 | |
| JP | 4890256 B2 * | 3/2012 | ............. C08L 27/06 |
| JP | 2012-208136 A | 10/2012 | |
| WO | WO-2006038447 A1 * | 4/2006 | ............. C08L 27/06 |
| WO | WO 2009/093562 A1 | 7/2009 | |

OTHER PUBLICATIONS

JP (Year: 2012).*
Japan Patent Office, International Search Report in International Application No. PCT/JP2019/011240 (Jun. 18, 2019).
Japan Patent Office, Written Opinion of the International Searching Authority in International Application No. PCT/JP2019/011240 (Jun. 18, 2019).
The International Bureau of Wipo, International Preliminary Report on Patentability in International Application No. PCT/JP2019/011240 (Oct. 1, 2020).
Korean Intellectual Property Office, Patent Rejection Decision in Korean Patent Application No. 10-2020-7029440 (Oct. 26, 2023).

* cited by examiner

*Primary Examiner* — Matthew D Matzek
(74) *Attorney, Agent, or Firm* — Leydig, Voit & Mayer, Ltd.

(57) ABSTRACT

A fiber for artificial hair, the fiber containing 50 parts by mass or more and 95 parts by mass or less of a vinyl chloride-based resin and 5 parts by mass or more and 50 parts by mass or less of a vinyl-based copolymer resin, in which the vinyl-based copolymer resin contains 60% by mass or more and less than 70% by mass of a styrene-based monomer unit and more than 30% by mass and 40% by mass or less of an acrylonitrile-based monomer unit on the basis of the entire vinyl-based copolymer resin.

12 Claims, No Drawings

FIBER FOR ARTIFICIAL HAIR AND HAIR ACCESSORY PRODUCT

CROSS-REFERENCE TO RELATED APPLICATIONS

This patent application is the U.S. national phase of International Application No. PCT/JP2019/011240, filed on Mar. 18, 2019, which claims the benefit of Japanese Patent Application No. 2018-052130, filed Mar. 20, 2018, the disclosures of which are incorporated herein by reference in their entireties for all purposes.

TECHNICAL FIELD

The present invention relates to a fiber for artificial hair excellent in spinnability, volume, and heat resistance and a hair accessory product using the same.

BACKGROUND ART

Vinyl chloride-based resin fibers obtained by spinning a vinyl chloride-based resin are excellent in flexibility, and thus are often used as fibers for artificial hair constituting hair accessory products (for example, see Patent Literature 1 described below). However, since the vinyl chloride-based resin as a raw material has a large specific gravity, the vinyl chloride-based resin fibers are not suitable for styles requiring volume in artificial hair use applications. In order to reduce the specific gravity of the vinyl chloride-based resin fibers, a means for blending a vinyl-based copolymer resin having a smaller specific gravity than that of the vinyl chloride-based resin has been proposed (for example, see Patent Literature 2 described below).

CITATION LIST

Patent Literature

Patent Literature 1: Japanese Unexamined Patent Publication No. 2001-131824
Patent Literature 2: International Publication WO 2006/038447

SUMMARY OF INVENTION

Technical Problem

However, in the case of using a fiber for artificial hair containing a vinyl-based copolymer resin, heat resistance is not sufficient depending on the compositional ratio of the vinyl-based copolymer resin. For this reason, the fiber for artificial hair is crimped when being processed into a hair accessory product and thus has a problem in that the types of styles that can be created are limited.

Moreover, it is demanded for the fiber for artificial hair to suppress the breakage of the fiber (yarn breakage) at the time of performing melt-spinning or the like and to be excellent in spinnability. In addition, it is demanded for the fiber for artificial hair to be excellent in volume (specific volume) from the viewpoint that a wide variety of styles is achieved.

According to an aspect of the present invention, there is provided a fiber for artificial hair excellent in spinnability, volume, and heat resistance. According to another aspect of the present invention, there is provided a hair accessory product using the fiber for artificial hair.

Solution to Problem

According to an aspect of the present invention, there is provided a fiber for artificial hair, the fiber containing 50 parts by mass or more and 95 parts by mass or less of a vinyl chloride-based resin and 5 parts by mass or more and 50 parts by mass or less of a vinyl-based copolymer resin, in which the vinyl-based copolymer resin contains 60% by mass or more and less than 70% by mass of a styrene-based monomer unit and more than 30% by mass and 40% by mass or less of an acrylonitrile-based monomer unit on the basis of the entire vinyl-based copolymer resin.

According to another aspect of the present invention, there is provided a hair accessory product including the fiber for artificial hair.

Advantageous Effects of Invention

According to an aspect of the present invention, it is possible to provide a fiber for artificial hair excellent in spinnability, volume, and heat resistance. According to another aspect of the present invention, it is possible to provide a hair accessory product using the fiber for artificial hair. According to still another aspect of the present invention, it is possible to provide an application of a fiber to artificial hair. According to still another aspect of the present invention, it is possible to provide an application of a fiber to a hair accessory product.

DESCRIPTION OF EMBODIMENTS

Hereinafter, embodiments for carrying out the present invention will be described in detail. Incidentally, the present invention is not limited to embodiments which will be described below.

In the numerical ranges that are described stepwise in the present specification, the upper limit value or the lower limit value of the numerical range of a certain stage can be arbitrarily combined with the upper limit value or the lower limit value of the numerical range of another stage. In the numerical ranges that are described in the present specification, the upper limit value or the lower limit value of the numerical value range may be replaced with the value shown in the Examples. Materials listed as examples in the present specification can be used singly or in combinations of two or more, unless otherwise specifically indicated. When a plurality of substances corresponding to each component exist in the composition, the content of each component in the composition means the total amount of the plurality of substances that exist in the composition, unless otherwise specified.

A fiber for artificial hair of the present embodiment contains 50 parts by mass or more and 95 parts by mass or less of a vinyl chloride-based resin and 5 parts by mass or more and 50 parts by mass or less of a vinyl-based copolymer resin (excluding a resin corresponding to the vinyl chloride-based resin), and the vinyl-based copolymer resin contains 60% by mass or more and less than 70% by mass of a styrene-based monomer unit and more than 30% by mass and 40% by mass or less of an acrylonitrile-based monomer unit on the basis of the entire vinyl-based copolymer resin. The fiber for artificial hair of the present embodiment is configured by a resin composition (fibrous resin composition) containing 50 parts by mass or more and 95 parts by mass or less of the vinyl chloride-based resin and 5 parts by mass or more and 50 parts by mass or less of the vinyl-based copolymer resin.

The fiber for artificial hair of the present embodiment can be used in a hair accessory product of the present embodiment. The hair accessory product of the present embodiment includes the fiber for artificial hair of the present embodiment and may have an embodiment of being composed of the fiber for artificial hair of the present embodiment. As the hair accessory product, wigs and the like are exemplified.

The fiber for artificial hair of the present embodiment contains 50 parts by mass or more and 95 parts by mass or less of the vinyl chloride-based resin and 5 parts by mass or more and 50 parts by mass or less of the vinyl-based copolymer resin with respect to 100 parts by mass of the total of the vinyl chloride-based resin and the vinyl-based copolymer resin.

When the content of the vinyl chloride-based resin is more than 95 parts by mass, the volume of a fiber for artificial hair to be obtained is not sufficient. The content of the vinyl chloride-based resin is preferably 92 parts by mass or less, more preferably 90 parts by mass or less, further preferably less than 90 parts by mass, particularly preferably 85 parts by mass or less, extremely preferably 80 parts by mass or less, very preferably 75 parts by mass or less, even more preferably 70 parts by mass or less, further preferably less than 70 parts by mass, particularly preferably 65 parts by mass or less, extremely preferably 60 parts by mass or less, very preferably less than 60 parts by mass, and even more preferably 55 parts by mass or less, from the viewpoint of easily obtaining a sufficient volume.

When the content of the vinyl chloride-based resin is less than 50 parts by mass, the spinnability of the resin composition is deteriorated. The content of the vinyl chloride-based resin is preferably more than 50 parts by mass, more preferably 52 parts by mass or more, further preferably 55 parts by mass or more, particularly preferably more than 55 parts by mass, extremely preferably 60 parts by mass or more, very preferably 65 parts by mass or more, even more preferably 70 parts by mass or more, further preferably more than 70 parts by mass, particularly preferably 75 parts by mass or more, extremely preferably 80 parts by mass or more, very preferably 85 parts by mass or more, and even more preferably 90 parts by mass or more, from the viewpoint of easily obtaining excellent spinnability.

When the content of the vinyl-based copolymer resin is less than 5 parts by mass, the volume of a fiber for artificial hair to be obtained is not sufficient. The content of the vinyl-based copolymer resin is preferably 8 parts by mass or more, more preferably 10 parts by mass or more, further preferably more than 10 parts by mass, particularly preferably 15 parts by mass or more, extremely preferably 20 parts by mass or more, very preferably 25 parts by mass or more, even more preferably 30 parts by mass or more, further preferably more than 30 parts by mass, particularly preferably 35 parts by mass or more, extremely preferably 40 parts by mass or more, very preferably more than 40 parts by mass, and even more preferably 45 parts by mass or more, from the viewpoint of easily obtaining a sufficient volume.

When the content of the vinyl-based copolymer resin is more than 50 parts by mass, the spinnability of the resin composition is deteriorated. The content of the vinyl-based copolymer resin is preferably less than 50 parts by mass, more preferably 48 parts by mass or less, further preferably 45 parts by mass or less, particularly preferably less than 45 parts by mass, extremely preferably 40 parts by 20 mass or less, very preferably 35 parts by mass or less, even more preferably 30 parts by mass or less, further preferably less than 30 parts by mass, particularly preferably 25 parts by mass or less, extremely preferably 20 parts by mass or less, very preferably 15 parts by mass or less, and even more preferably 10 parts by mass or less, from the viewpoint of easily obtaining excellent spinnability.

The vinyl-based copolymer resin contains 60% by mass or more and less than 70% by mass of the styrene-based monomer unit and more than 30% by mass and 40% by mass or less of the acrylonitrile-based monomer unit on the basis of the entire vinyl-based copolymer resin. When the ratio of the styrene-based monomer unit is 70% by mass or more, heat resistance is not sufficient. When the ratio of the styrene-based monomer unit is less than 60% by mass, spinnability is deteriorated. When the ratio of the acrylonitrile-based monomer unit is 30% by mass or less, heat resistance is not sufficient. When the ratio of the acrylonitrile-based monomer unit is more than 40% by mass, spinnability is deteriorated.

The vinyl-based copolymer resin preferably contains 60% by mass or more and less than 70% by mass of the styrene-based monomer unit and more than 30% by mass and 40% by mass or less of the acrylonitrile-based monomer unit on the basis of the total of the styrene-based monomer unit and the acrylonitrile-based monomer unit, from the viewpoint of easily obtaining excellent spinnability and heat resistance.

The ratio of the styrene-based monomer unit is preferably 69% by mass or less, more preferably less than 69% by mass, further preferably 68.5% by mass or less, and particularly preferably 68% by mass or less on the basis of the entire vinyl-based copolymer resin or on the basis of the total of the styrene-based monomer unit and the acrylonitrile-based monomer unit, from the viewpoint of easily obtaining sufficient heat resistance.

The ratio of the styrene-based monomer unit is preferably more than 60% by mass, more preferably 61% by mass or more, further preferably 62% by mass or more, particularly preferably more than 62% by mass, extremely preferably 63% by mass or more, very preferably 65% by mass or more, even more preferably 67% by mass or more, and further preferably 68% by mass or more on the basis of the entire vinyl-based copolymer resin or on the basis of the total of the styrene-based monomer unit and the acrylonitrile-based monomer unit, from the viewpoint of easily obtaining excellent spinnability.

The ratio of the acrylonitrile-based monomer unit is preferably 31% by mass or more, more preferably more than 31% by mass, further preferably 31.5% by mass or more, and particularly preferably 32% by mass or more on the basis of the entire vinyl-based copolymer resin or on the basis of the total of the styrene-based monomer unit and the acrylonitrile-based monomer unit, from the viewpoint of easily obtaining sufficient heat resistance.

The ratio of the acrylonitrile-based monomer unit is preferably less than 40% by mass, more preferably 39% by mass or less, further preferably 38% by mass or less, particularly preferably less than 38% by mass, extremely preferably 37% by mass or less, very preferably 35% by mass or less, even more preferably 33% by mass or less, and further preferably 32% by mass or less on the basis of the entire vinyl-based copolymer resin or on the basis of the total of the styrene-based monomer unit and the acrylonitrile-based monomer unit, from the viewpoint of easily obtaining excellent spinnability.

The vinyl chloride-based resin is a resin having a structural unit derived from vinyl chloride. As the vinyl chloride-based resin, conventionally known resins can be used. A homopolymer resin of vinyl chloride (a homopolymer of vinyl chloride) or a copolymer resin of vinyl chloride and various monomers (comonomers; monomers other than vinyl chloride; the same applies hereinafter) is exemplified, and there is no particular limitation. Typical examples of the copolymer resin include copolymer resins of vinyl chloride and vinylesters, such as a vinyl chloride-vinyl acetate copolymer resin and a vinyl chloride-vinyl propionate copolymer resin; copolymer resins of vinyl chloride and acrylic acid esters, such as a vinyl chloride-butyl acrylate copolymer resin and a vinyl chloride-2-ethylhexyl acrylate copolymer resin; copolymer resins of vinyl chloride and olefins, such as a vinyl chloride-ethylene copolymer resin and a vinyl chloride-propylene copolymer resin; and a vinyl chloride-acrylonitrile copolymer resin. The content of the comonomer in the copolymer resin is not particularly limited and can be determined according to molding processability to fibers, characteristics of fibers, and the like. From the viewpoint of easily obtaining excellent spinnability, volume, and heat resistance, the vinyl chloride-based resin preferably includes a homopolymer resin of vinyl chloride, a vinyl chloride-ethylene copolymer resin, and a vinyl chloride-vinyl acetate copolymer resin, and more preferably includes a homopolymer resin of vinyl chloride.

The vinyl chloride-based resin can be produced by emulsion polymerization, bulk polymerization, suspension polymerization, or the like. As the vinyl chloride-based resin, in view of the initial colorability of the fiber, or the like, a polymer produced by suspension polymerization is preferred.

The viscosity-average polymerization degree of the vinyl chloride-based resin is preferably 450 or more, more preferably 650 or more, further preferably 750 or more, particularly preferably 900 or more, and extremely preferably 1000 or more. When the viscosity-average polymerization degree is 450 or more, a decrease in the entanglement of the resin is suppressed, and thus a sufficient strength is easily obtained. The viscosity-average polymerization degree of the vinyl chloride-based resin is preferably 1700 or less, more preferably 1450 or less, further preferably 1300 or less, particularly preferably 1200 or less, and extremely preferably 1100 or less. When the viscosity-average polymerization degree is 1700 or less, gelation is likely to occur, the fiber is hardly broken (is likely to be excellent in spinnability), and sufficient productivity is easily obtained. From these viewpoints, the viscosity-average polymerization degree of the vinyl chloride-based resin is preferably 450 or more and 1700 or less, 650 or more and 1450 or less, 1000 or more and 1700 or less, 750 or more and 1300 or less, 900 or more and 1200 or less, or 1000 or more and 1100 or less. The viscosity-average polymerization degree of the vinyl chloride-based resin is preferably 450 or more and 1700 or less from the viewpoint of easily obtaining a sufficient strength as the fiber and excellent spinnability. In the case of using a homopolymer resin of vinyl chloride, the viscosity-average polymerization degree of the vinyl chloride-based resin is preferably 650 or more and 1450 or less from the viewpoint of achieving more suitable molding processability and fiber characteristics since gelation is likely to occur, the fiber is hardly broken, and sufficient productivity is easily obtained. In the case of using a copolymer resin, although also depending on the content of the comonomer, the viscosity-average polymerization degree of the vinyl chloride-based resin is preferably 1000 or more and 1700 or less. The viscosity-average polymerization degree can be calculated according to JIS-K6721 by measuring the specific viscosity of a polymer solution, which is obtained by dissolving 200 mg of a resin in 50 ml of nitrobenzene, in a constant temperature tank set at 30° C. using an Ubbelohde viscometer.

The content of the vinyl chloride-based resin is preferably in the following range on the basis of the total mass of the fiber for artificial hair. The content of the vinyl chloride-based resin is preferably 90% by mass or less, more preferably 85% by mass or less, further preferably 80% by mass or less, particularly preferably 75% by mass or less, extremely preferably 70% by mass or less, very preferably 65% by mass or less, even more preferably 60% by mass or less, and further preferably 55% by mass or less, from the viewpoint of easily obtaining a sufficient volume. The content of the vinyl chloride-based resin is preferably 40% by mass or more, more preferably 45% by mass or more, further preferably 50% by mass or more, particularly preferably 55% by mass or more, extremely preferably 60% by mass or more, very preferably 65% by mass or more, even more preferably 70% by mass or more, further preferably 75% by mass or more, particularly preferably 80% by mass or more, and extremely preferably 85% by mass or more, from the viewpoint of easily obtaining excellent spinnability. From these viewpoints, the content of the vinyl chloride-based resin is preferably 40% by mass or more and 90% by mass or less.

The vinyl-based copolymer resin contains 60% by mass or more and less than 70% by mass of the styrene-based monomer unit (a structural unit derived from a styrene-based monomer) and more than 30% by mass and 40% by mass or less of the acrylonitrile-based monomer unit (a structural unit derived from an acrylonitrile-based monomer) on the basis of the entire vinyl-based copolymer resin, and is obtained by copolymerizing 60% by mass or more and less than 70% by mass of the styrene-based monomer and more than 30% by mass and 40% by mass or less of the acrylonitrile-based monomer on the basis of the entire monomer for obtaining the vinyl-based copolymer resin. The vinyl-based copolymer resin can be obtained by a known method described in Japanese Unexamined Patent Publication No. 2012-208136, or the like.

As the styrene-based monomer, known styrene-based monomers can be used. Examples of the styrene-based monomer include styrene; and styrene derivatives such as α-methylstyrene, o-methylstyrene, m-methylstyrene, p-methylstyrene, t-butylstyrene, and chlorostyrene. The styrene-based monomer preferably includes styrene (that is, the styrene-based monomer unit preferably includes a styrene monomer unit) from the viewpoint of easily obtaining excellent spinnability, volume, and heat resistance.

As the acrylonitrile-based monomer, known acrylonitrile-based monomers can be used. Examples of the acrylonitrile-based monomer include acrylonitrile and methacrylonitrile. The acrylonitrile-based monomer preferably includes acrylonitrile (that is, the acrylonitrile-based monomer unit preferably includes an acrylonitrile monomer unit) from the viewpoint of easily obtaining excellent spinnability, volume, and heat resistance.

The vinyl-based copolymer resin may have an embodiment which is composed of 60% by mass or more and less than 70% by mass of the styrene-based monomer unit and more than 30% by mass and 40% by mass or less of the acrylonitrile-based monomer unit, but may have a monomer unit other than the styrene-based monomer unit and the acrylonitrile-based monomer unit.

As the monomer unit other than the styrene-based monomer unit and the acrylonitrile-based monomer unit, a vinyl-based monomer unit (excluding a monomer unit corresponding to the styrene-based monomer unit) can be used. Examples of the vinyl-based monomer include acrylic acid, methyl acrylate, ethyl acrylate, n-butyl acrylate, 2-ethylhexyl acrylate, methacrylic acid, methyl methacrylate, ethyl methacrylate, n-butyl methacrylate, 2-ethylhexyl methacrylate, and maleic anhydride.

The total amount of the styrene-based monomer unit and the acrylonitrile-based monomer unit in the vinyl-based copolymer resin is preferably 90% by mass or more, more preferably 92% by mass or more, further preferably 95% by mass or more, particularly preferably 98% by mass or more, extremely preferably 99% by mass or more, and very preferably 99.5% by mass or more on the basis of the entire vinyl-based copolymer resin, from the viewpoint of easily obtaining excellent spinnability, volume, and heat resistance.

The content of the vinyl-based copolymer resin is preferably in the following range on the basis of the total mass of the fiber for artificial hair. The content of the vinyl-based copolymer resin is preferably 10% by mass or more, more preferably 15% by mass or more, further preferably 20% by mass or more, particularly preferably 25% by mass or more, extremely preferably 30% by mass or more, very preferably 35% by mass or more, even more preferably 40% by mass or more, and further preferably 45% by mass or more, from the viewpoint of easily obtaining a sufficient volume. The content of the vinyl-based copolymer resin is preferably 60% by mass or less, more preferably 55% by mass or less, further preferably 50% by mass or less, particularly preferably 45% by mass or less, extremely preferably 40% by mass or less, very preferably 35% by mass or less, even more preferably 30% by mass or less, further preferably 25% by mass or less, particularly preferably 20% by mass or less, and extremely preferably 15% by mass or less, from the viewpoint of easily obtaining excellent spinnability. From these viewpoints, the content of the vinyl-based copolymer resin is preferably 10% by mass or more and 60% by mass or less.

The total amount of the vinyl chloride-based resin and the vinyl-based copolymer resin is preferably in the following range on the basis of the total mass of the fiber for artificial hair. The total amount thereof is preferably 50% by mass or more, more preferably 60% by mass or more, further preferably 70% by mass or more, particularly preferably 80% by mass or more, extremely preferably 90% by mass or more, very preferably 92% by mass or more, even more preferably 95% by mass or more, and further preferably 96% by mass or more, from the viewpoint of easily obtaining excellent spinnability, volume, and heat resistance. The total amount thereof is preferably 100% by mass or less, more preferably less than 100% by mass, further preferably 99% by mass or less, particularly preferably 98% by mass or less, and extremely preferably 97% by mass or less, from the viewpoint of easily obtaining excellent spinnability, volume, and heat resistance. From these viewpoints, the total amount thereof is preferably 50% by mass or more and 100% by mass or less.

An antistatic agent, a heat stabilizer, and/or a lubricant can be appropriately mixed at a predetermined ratio in the fiber for artificial hair of the present embodiment. That is, the fiber for artificial hair of the present embodiment can contain an antistatic agent, a heat stabilizer, and/or a lubricant.

As the antistatic agent, cationic, anionic, amphoteric antistatic agents, and the like can be used. The content (blended amount) of the antistatic agent is preferably 0.01 part by mass or more and 1 part by mass or less with respect to 100 parts by mass of the total of the vinyl chloride-based resin and the vinyl-based copolymer resin or 100 parts by mass of the fiber for artificial hair (fibrous resin composition). When the content of the antistatic agent is 0.01 part by mass or more, static electricity hardly occurs, yarns are likely to converge and unlikely to be entangled during the process of winding, and thus yarn breakage hardly occurs. When the content of the antistatic agent is 1 part by mass or less, there is an economic advantage.

As the heat stabilizer, conventionally known heat stabilizers can be used. Among them, as the heat stabilizer, it is preferable to use one or two or more kinds selected from a Ca—Zn-based heat stabilizer, a hydrotalcite-based heat stabilizer, a tin-based heat stabilizer, an epoxy-based heat stabilizer, and a β-diketone-based heat stabilizer. The heat stabilizer can be used for improving thermal decomposition at the time of molding, long-run workability, the color tone of filament, and the like. In particular, from the viewpoint of achieving an excellent balance between molding processability and yarn properties, a combination of a Ca—Zn-based heat stabilizer and a hydrotalcite-based heat stabilizer is preferred as the heat stabilizer. The content (blended amount) of the heat stabilizer is preferably 0.1 part by mass or more and 5.0 parts by mass or less with respect to 100 parts by mass of the total of the vinyl chloride-based resin and the vinyl-based copolymer resin or 100 parts by mass of the fiber for artificial hair (fibrous resin composition). When the content of the heat stabilizer is 0.1 part by mass or more, it is easily suppressed that the vinyl chloride-based resin is thermally degraded and turns yellow. When the content of the heat stabilizer is 5.0 parts by mass or less, there is an economic advantage. Specific examples of the hydrotalcite-based heat stabilizer include a hydrotalcite compound, and further specific examples thereof include a complex salt compound which is composed of magnesium and/or an alkali metal and aluminum; a complex salt compound which is composed of zinc, magnesium, and aluminum; and a compound obtained by dehydrating crystal water from them. The hydrotalcite compound may be a natural or synthetic product. The synthetic method of the synthetic product may be a conventionally known method.

Examples of the Ca—Zn-based heat stabilizer include zinc stearate, calcium stearate, zinc 12-hydroxystearate, and calcium 12-hydroxystearate. Examples of the hydrotalcite-based heat stabilizer include CP-410A manufactured by Nissan Chemical Corporation and ALCAMIZER manufactured by Kyowa Chemical Industry Co., Ltd.

Examples of the tin-based heat stabilizer include mercapto tin-based heat stabilizers such as dimethyltin mercapto, dimethyltin mercaptide, dibutyltin mercapto, dioctyltin mercapto, a dioctyltin mercapto polymer, and dioctyltin mercapto acetate; maleate tin-based heat stabilizers such as dimethyltin maleate, dibutyltin maleate, dioctyltin maleate, and a dioctyltin maleate polymer; and laurate tin-based heat stabilizers such as dimethyltin laurate, dibutyltin laurate, and dioctyltin laurate. Examples of the epoxy-based heat stabilizer include epoxidized soybean oil and epoxidized linseed oil. Examples of the β-diketone-based heat stabilizer include stearoyl benzoyl methane (SBM) and dibenzoyl methane (DBM).

As the lubricant, conventionally known lubricants can be used. The lubricant particularly preferably includes one or two or more kinds selected from a metal soap-based lubricant, a higher fatty acid lubricant, an ester-based lubricant, a higher alcohol-based lubricant, and a hydrocarbon-based lubricant. The lubricant can reduce friction with a metal surface of a processing machine and friction between resins and can enhance flowability to improve processability. The content (blended amount) of the lubricant is preferably 0.2 part by mass or more and 5.0 parts by mass or less with respect to 100 parts by mass of the total of the vinyl chloride-based resin and the vinyl-based copolymer resin or 100 parts by mass of the fiber for artificial hair (fibrous resin composition). When the content of the lubricant is 0.2 part by mass or more, flowability is satisfactory and thus processability is excellent. When the content of the lubricant is 5.0 parts by mass or less, sufficient friction with a metal surface of a processing machine is obtained so that the resin is likely to be stably extruded.

Examples of the metal soap-based lubricant include metal soaps such as stearate, laurate, palmitate, and oleate of Na, Mg, Al, Ca, Ba, and the like. Examples of the higher fatty acid lubricant include saturated fatty acids such as stearic acid, palmitic acid, myristic acid, lauric acid, and capric acid; unsaturated fatty acids such as oleic acid; and mixtures thereof. Examples of the ester-based lubricant include a pentaerythritol-based lubricant, a montanic acid wax-based lubricant, and a lubricant composed of an alcohol and a fatty acid. Examples of the pentaerythritol-based lubricant include monoesters, diesters, triesters, or tetraesters of a higher fatty acid with pentaerythritol or dipentaerythritol; and mixtures thereof. Examples of the montanic acid wax-based lubricant include esters of montanic acids with higher alcohols (such as stearyl alcohol, palmityl alcohol, myristyl alcohol, lauryl alcohol, and oleyl alcohol). Examples of the higher alcohol-based lubricant include stearyl alcohol, palmityl alcohol, myristyl alcohol, lauryl alcohol, and oleyl alcohol. Examples of the hydrocarbon-based lubricant include polyethylene wax and polypropylene wax.

The fiber for artificial hair (fibrous resin composition) of the present embodiment can contain a known blending agent in addition to the antistatic agent and the like, depending on the intended use. Examples of the blending agent include a processing aid, a plasticizer, a reinforcing agent, an ultraviolet absorber, an antioxidant, a filler, a flame retardant, a pigment, an initial coloration-improving agent, an electrical conductivity-imparting agent, and a perfume.

The fiber for artificial hair (fibrous resin composition) of the present embodiment can be obtained through a step of melting and kneading 50 parts by mass or more and 95 parts by mass or less of a vinyl chloride-based resin and 5 parts by mass or more and 50 parts by mass or less of a vinyl-based copolymer resin. The fiber for artificial hair (fibrous resin composition) of the present embodiment can be obtained, for example, by the following method.

First, an antistatic agent, a heat stabilizer, a lubricant, and the like are appropriately mixed at a predetermined ratio in the vinyl chloride-based resin and the vinyl-based copolymer resin, and stirring and mixing are performed using a conventionally known Henschel mixer, supermixer, ribbon blender, or the like to obtain a powder compound, and then melting and kneading are performed by an extruder to obtain a pellet compound. The powder compound can be produced by hot blending or cold blending. As the production conditions, usual conditions can be used. In order to reduce the volatile content in the resin composition, it is preferable to use hot blending. The pellet compound can be produced in the same manner as in usual production of a vinyl chloride-based pellet compound. For example, the pellet compound can be obtained by using a kneading machine such as a single screw extruder, a counter-rotating twin screw extruder, a conical twin screw extruder, a corotating twin screw extruder, a cokneader, a planetary gear extruder, or a roll kneader. The conditions when the pellet compound is produced are not particularly limited, but it is preferable to set the resin temperature to be 190° C. or lower in order to prevent the thermal degradation of the vinyl chloride-based resin. In addition, in order to remove a metal piece of the screw or a fiber attached to a protection glove, which may be mixed at a small amount in the pellet compound, a mesh can be installed in the vicinity of the tip of the screw.

A cold cutting method can be employed in production of the pellet. A means for removing "cutting chips" (fine powder generated when the pellet is produced) and the like that may be mixed during the cold cutting can be employed. In addition, when used for a long time, the cutter has a nicked edge so that cutting chips are likely to occur, and thus it is preferable to perform an appropriate replacement.

Next, the resin composition is extruded by using a metallic nozzle having a plurality of nozzle holes under the conditions of a cylinder temperature of 140° C. or higher and 190° C. or lower (preferably 150° C. or higher and 190° C. or lower) and a nozzle temperature of 180±15° C. and melt spinning is performed. In extrusion, conventionally known extruders can be used. For example, a single screw extruder, a counter-rotating twin screw extruder, a conical twin screw extruder, or the like can be used, but a single screw extruder having a bore diameter of about 30 mm$\phi$ or more and 85 mm$\phi$ or less or a conical extruder having a bore diameter of about 30 mm$\phi$ or more and 50 mm$\phi$ or less is particularly preferably used. When the bore diameter is the above upper limit or less, the extrusion amount is not too large, the nozzle pressure is not excessively large, and it is easily suppressed that the temperature of the resin is increased to cause degradation.

The non-stretched yarn (the fiber of the resin composition) melt-spun from the nozzle is introduced into a heating cylinder (heating cylinder temperature: about 250° C.), instantaneously heat-treated, and wound by a drawing machine installed at a position of about 4.5 m directly below the nozzle. The strand is still the non-stretched yarn. At the time of winding, the drawing speed can be adjusted so that the fineness of the non-stretched yarn is 150 dtex or more and 206 dtex or less.

Then, the non-stretched yarn is stretched two times or more and four times or less by a stretching machine (in an air atmosphere, at 90° C. or higher and 120° C. or lower), and heat-treated 0.5 times or more and 0.9 times or less using a heat treatment machine (in an air atmosphere, at 110° C. or higher and 140° C. or lower) to adjust the fineness to 64 dtex or more and 69 dtex or less so that a fiber for artificial hair (fibrous resin composition) can be produced.

The fiber for artificial hair obtained as described above is excellent in spinnability and can improve volume and heat resistance.

According to the present embodiment, it is possible to provide a method for producing a fiber for artificial hair, the method including a step of mixing 50 parts by mass or more and 95 parts by mass or less of a vinyl chloride-based resin and 5 parts by mass or more and 50 parts by mass or less of a vinyl-based copolymer resin. According to the present embodiment, it is possible to provide a method for producing a hair accessory product, the method including a step of processing the above-described fiber for artificial hair.

EXAMPLES

Hereinafter, specific embodiments of the present invention will be described in more detail by means of Examples and Comparative Examples, but the present invention is not limited only to these Examples.

<Production of Fiber for Artificial Hair>

Example 1

In a resin composition composed of 90 parts by mass of a vinyl chloride-based resin (TH-1000 manufactured by TAIYO VINYL CORPORATION) and 10 parts by mass of a vinyl-based copolymer resin (GR-AT-6S manufactured by Denka Company Limited) containing 68% by mass of a styrene monomer unit and 32% by mass of an acrylonitrile monomer unit, 0.5 part by mass of an antistatic agent (NEW ELEGAN ASK manufactured by NOF CORPORATION; ELEGAN is the registered trademark), 3 parts by mass of a hydrotalcite-based composite heat stabilizer (CP-410A manufactured by Nissan Chemical Corporation), 0.5 part by mass of epoxidized soybean oil (O-130P manufactured by Asahi Denka Co., Ltd.), and 0.8 part by mass of an ester-based lubricant (EW-100 manufactured by RIKEN VITAMIN CO., LTD.) were blended and then mixed by a ribbon blender, thereby obtaining a mixture. Compounding was performed by using an extruder having a diameter (bore diameter) of 40 mm at a cylinder temperature of 130° C. or higher and 170° C. or lower, thereby producing a pellet. The pellet was melt-spun by an extruder having a diameter of 30 mm at an extrusion rate of 10 kg/hr at a cylinder temperature of 140° C. or higher and 190° C. or lower and at a nozzle temperature of 180±15° C. by using a nozzle having a nozzle cross-sectional area of 0.06 mm$^2$, having a round shape, and having the number of holes of 120. Thereafter, heat-treating was performed by a heating cylinder installed directly below the nozzle for about 0.5 seconds or longer and 1.5 seconds or shorter, thereby obtaining a fiber with a fineness of 150 dtex. Next, sequentially performing a step of stretching the fiber obtained by melt-spinning three times in an air atmosphere at 100° C. and a step of thermally shrinking the stretched fiber in an air atmosphere at 120° C. until the fiber whole length was shrunk 0.75 times the fiber whole length before the treatment, thereby obtaining a fiber for artificial hair with a fineness of 67 dtex.

Examples 2 to 4 and Comparative Examples 1 to 4

Fibers for artificial hair with a fineness of 67 dtex were obtained in the same manner as in Example 1, except that the contents of the vinyl chloride-based resin and the vinyl-based copolymer resin and the ratio of the monomer unit in the vinyl-based copolymer resin were changed to the numerical values of Table 1.

<Evaluation>

As for the above-described fibers for artificial hair, spinnability (processability), volume, and heat resistance were evaluated according to the following evaluation methods and criteria. The results are shown in Table 1.

(1) Spinnability

As for spinnability, the occurrence status of the yarn breakage per an hour during melt-spinning for obtaining a non-stretched yarn in the production of the fiber for artificial hair was visually observed. The spinnability was evaluated according to the following criteria.

A: The yarn breakage is one time.
B: The yarn breakage is two times or more and three times or less.
C: The yarn breakage is four times or more.

(2) Volume

The volume was evaluated by the following procedure. First, the above-described fiber for artificial hair was cut into a length of 100 mm to obtain fiber pieces. The fiber pieces were filled in a 56 cc container (100 mm×14 mm×40 mm) until the container became full. The filled fiber pieces were taken out and then the mass of the fiber pieces was measured. Then, the specific volume was calculated by formula "Volume (cc) of the container/Mass (g) of the fiber pieces=Specific volume (cc/g)". The value of the specific volume was calculated by performing round off to two decimal places. The volume was evaluated according to the following criteria.

A: The specific volume is 2.5 cc/g or more.
B: The specific volume is 2.0 cc/g or more and 2.4 cc/g or less.
C: The specific volume is 1.5 cc/g or more and 1.9 cc/g or less.
D: The specific volume is less than 1.5 cc/g.

(3) Heat Resistance

The heat resistance was evaluated by visually confirming whether or not a crimp of a fiber bundle sample (length: 300 mm, mass: 2.0 g) obtained by bundling the above-described fibers for artificial hair occurs when the fiber bundle sample is heated in a Geer oven at 100° C. for 1 hour. The heat resistance was evaluated according to the following criteria.

A: No crimp occurs.
B: A crimp occurs.

TABLE 1

|  |  |  | Example |  |  |  | Comparative Example |  |  |  |
|---|---|---|---|---|---|---|---|---|---|---|
|  |  |  | 1 | 2 | 3 | 4 | 1 | 2 | 3 | 4 |
| Composition | Vinyl chloride-based resin | parts by mass | 90 | 70 | 55 | 70 | 98 | 40 | 70 | 70 |
|  | Vinyl-based copolymer resin | parts by mass | 10 | 30 | 45 | 30 | 2 | 60 | 30 | 30 |
|  | Vinyl-based copolymer resin | Styrene | % by mass | 68 | 68 | 68 | 62 | 68 | 68 | 82 | 50 |
|  |  | Acrylonitrile | % by mass | 32 | 32 | 32 | 38 | 32 | 32 | 18 | 50 |
| Evaluation | Spinnability |  | A | A | B | A | A | C | A | C |
|  | Volume |  | C | B | A | B | D | A | B | B |
|  | Heat resistance |  | A | A | A | A | A | A | B | A |

As materials described in Table 1, the following materials were employed.
(Vinyl Chloride-Based Resin)
Vinyl chloride-based resin (homopolymer resin of vinyl chloride, TH-1000 (viscosity-average polymerization degree: 1000) manufactured by TAIYO VINYL CORPORATION)
(Vinyl-Based Copolymer)
- Styrene monomer unit: 68% by mass, acrylonitrile monomer unit: 32% by mass (GR-AT-6S manufactured by Denka Company Limited)
- Styrene monomer unit: 62% by mass, acrylonitrile monomer unit: 38% by mass (prototype manufactured by Denka Company Limited)
- Styrene monomer unit: 82% by mass, acrylonitrile monomer unit: 18% by mass (AS-C800 manufactured by Denka Company Limited)
- Styrene monomer unit: 50% by mass, acrylonitrile monomer unit: 50% by mass (prototype manufactured by Denka Company Limited)

In all Examples, satisfactory results were obtained in all evaluation items. In Comparative Example 1, since the ratio of the vinyl-based copolymer resin of the resin composition was small, the volume was poor. In Comparative Example 2, since the ratio of the vinyl-based copolymer resin of the resin composition was large, the spinnability was poor. In Comparative Example 3, since the ratio of the acrylonitrile-based monomer unit in the vinyl-based copolymer resin was small, the heat resistance was poor. In Comparative Example 4, since the ratio of the acrylonitrile-based monomer unit in the vinyl-based copolymer resin was large, the spinnability was poor.

Wigs were produced using the fibers for artificial hair of Examples by a conventionally known method. In the obtained wigs, spinnability, volume, and heat resistance were satisfactory.

The invention claimed is:

1. A fiber for artificial hair, the fiber comprising 55 parts by mass or more and 90 parts by mass or less of a vinyl chloride-based resin and 10 parts by mass or more and 45 parts by mass or less of a vinyl-based copolymer resin with respect to 100 parts by mass of the total of the vinyl chloride-based resin and the vinyl-based copolymer resin, wherein
the vinyl-based copolymer resin contains 62% by mass or more and 68% by mass or less of a styrene-based monomer unit and 32% by mass or more and 38% by mass or less of an acrylonitrile-based monomer unit on the basis of the entire vinyl-based copolymer resin.

2. The fiber for artificial hair according to claim 1, wherein the styrene-based monomer unit includes a styrene monomer unit.

3. The fiber for artificial hair according to claim 1, wherein a viscosity-average polymerization degree of the vinyl chloride-based resin is 450 or more and 1700 or less.

4. A hair accessory product comprising the fiber for artificial hair according to claim 1.

5. The fiber for artificial hair according to claim 1, comprising 55 parts by mass or more and 75 parts by mass or less of the vinyl chloride-based resin.

6. The fiber for artificial hair according to claim 1, comprising 60 parts by mass or more and 70 parts by mass or less of the vinyl chloride-based resin.

7. The fiber for artificial hair according to claim 1, comprising 55 parts by mass or more and 80 parts by mass or less of the vinyl chloride-based resin.

8. The fiber for artificial hair according to claim 1, comprising 20 parts by mass or more and 45 parts by mass or less of the vinyl-based copolymer resin.

9. The fiber for artificial hair according to claim 1, comprising 35 parts by mass or more and 45 parts by mass or less of the vinyl-based copolymer resin.

10. The fiber for artificial hair according to claim 1, comprising 25 parts by mass or more and 40 parts by mass or less of the vinyl-based copolymer resin.

11. The fiber for artificial hair according to claim 1, wherein the vinyl-based copolymer resin contains more than 32% by mass and 35% by mass or less of the acrylonitrile-based monomer unit.

12. The fiber for artificial hair according to claim 1, wherein the acrylonitrile-based monomer unit includes an acrylonitrile monomer unit.

* * * * *